(12) United States Patent
Kim

(10) Patent No.: US 7,975,849 B2
(45) Date of Patent: *Jul. 12, 2011

(54) PACKAGING CASE OF WIPER BLADE

(75) Inventor: In Kyu Kim, Gyeonggi-do (KR)

(73) Assignees: ADM21 Co., Ltd., Gyeonggi-do (KR); In-Kyu Kim, Gyeonggi-do (KR)

( * ) Notice: Subject to any disclaimer, the term of this patent is extended or adjusted under 35 U.S.C. 154(b) by 304 days.

This patent is subject to a terminal disclaimer.

(21) Appl. No.: 11/784,189

(22) Filed: Apr. 4, 2007

(65) Prior Publication Data

US 2008/0245691 A1 Oct. 9, 2008

(30) Foreign Application Priority Data

Apr. 4, 2006 (KR) .................. 10-2006-0030503

(51) Int. Cl.
 *B65D 73/00* (2006.01)
 *B65D 75/32* (2006.01)
 *B65D 75/28* (2006.01)
(52) U.S. Cl. .................. 206/470; 206/471; 206/1.5
(58) Field of Classification Search .................. 206/470, 206/461, 335, 464, 471, 806, 1.5, 467; 220/4.22, 220/4.23

See application file for complete search history.

(56) References Cited

U.S. PATENT DOCUMENTS

| | | | | |
|---|---|---|---|---|
| 4,059,219 A | * | 11/1977 | Reifers et al. | 206/521.1 |
| 4,666,037 A | | 5/1987 | Weissman | 206/63.5 |
| 5,353,935 A | * | 10/1994 | Yeager et al. | 206/470 |
| 5,545,956 A | | 8/1996 | Salvio et al. | 318/283 |
| 5,584,387 A | | 12/1996 | Grant | |
| 5,593,036 A | | 1/1997 | Dyble et al. | |
| 5,699,913 A | * | 12/1997 | Richardson | 206/470 |
| 5,829,593 A | | 11/1998 | Appleton | 206/454 |
| 5,899,334 A | | 5/1999 | Domerchie et al. | |
| 5,927,501 A | | 7/1999 | Herbruck | 206/541 |
| 6,126,008 A | * | 10/2000 | Cox | 206/471 |
| 6,321,905 B1 | | 11/2001 | Sykes | |
| 6,766,906 B2 | | 7/2004 | Charng | |
| 6,779,661 B1 | | 8/2004 | Kotlarski | 206/349 |
| 7,258,233 B2 | | 8/2007 | Lee | 206/470 |
| 7,337,900 B2 | | 3/2008 | Reiber et al. | 206/349 |
| 7,527,151 B2 | | 5/2009 | Park | 206/470 |
| 2005/0082185 A1 | * | 4/2005 | Lee | 206/335 |
| 2005/0252812 A1 | | 11/2005 | Lewis | 206/461 |

(Continued)

FOREIGN PATENT DOCUMENTS

JP 7315443 A 12/1995

(Continued)

*Primary Examiner* — Steven A. Reynolds
(74) *Attorney, Agent, or Firm* — Seed IP Law Group PLLC

(57) ABSTRACT

Disclosed herein is a packaging case of a wiper blade used to wipe a windscreen of automobiles. The wiper blade includes a wiper strip to wipe a windshield of an automobile. The packaging case includes a body having an accommodation space to accommodate the wiper blade and an opening to open the accommodation space, a cover connected pivotally to a first side of the body via a first connecting part to cover the opening, and a locking section connected pivotally to a second side of the body, opposed to the first side, via a second connecting part to be engaged with the body with one end of the cover interposed between the locking section and the body. The packaging case can protect the wiper blade from external force and prevent damage of the wiper blade during delivery and distribution, and can ensure simple, compact and tight packaging of the wiper blade.

16 Claims, 5 Drawing Sheets

U.S. PATENT DOCUMENTS

| | | | |
|---|---|---|---|
| 2006/0081493 A1 | 4/2006 | Park | 206/470 |
| 2007/0017842 A1* | 1/2007 | Clamagirand et al. | 206/471 |
| 2007/0235362 A1* | 10/2007 | Lewis | 206/470 |
| 2007/0272577 A1* | 11/2007 | Kim | 206/470 |

FOREIGN PATENT DOCUMENTS

| | | |
|---|---|---|
| JP | 10291537 A | 11/1998 |
| JP | 2000177774 A | 6/2000 |
| JP | 2003230550 A | 8/2003 |

\* cited by examiner

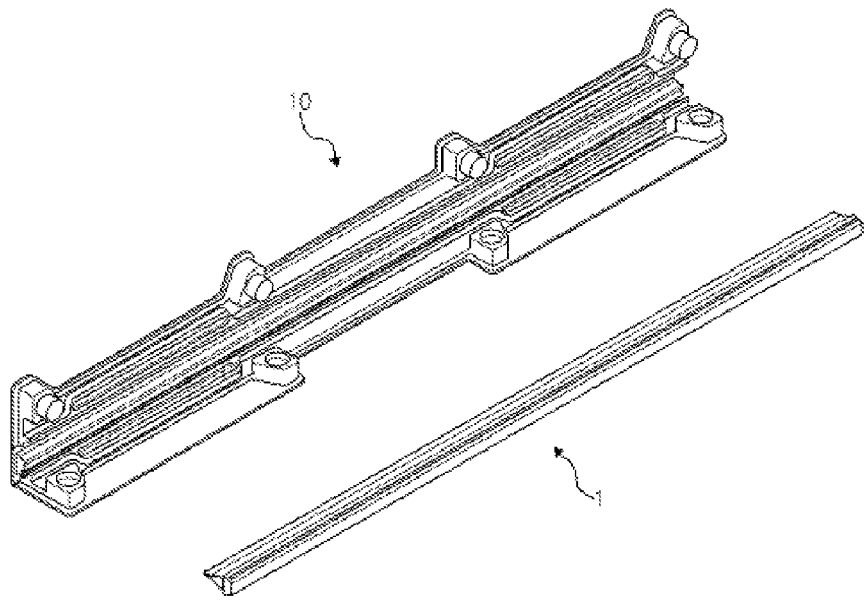
*FIG. 1     (Prior Art)*
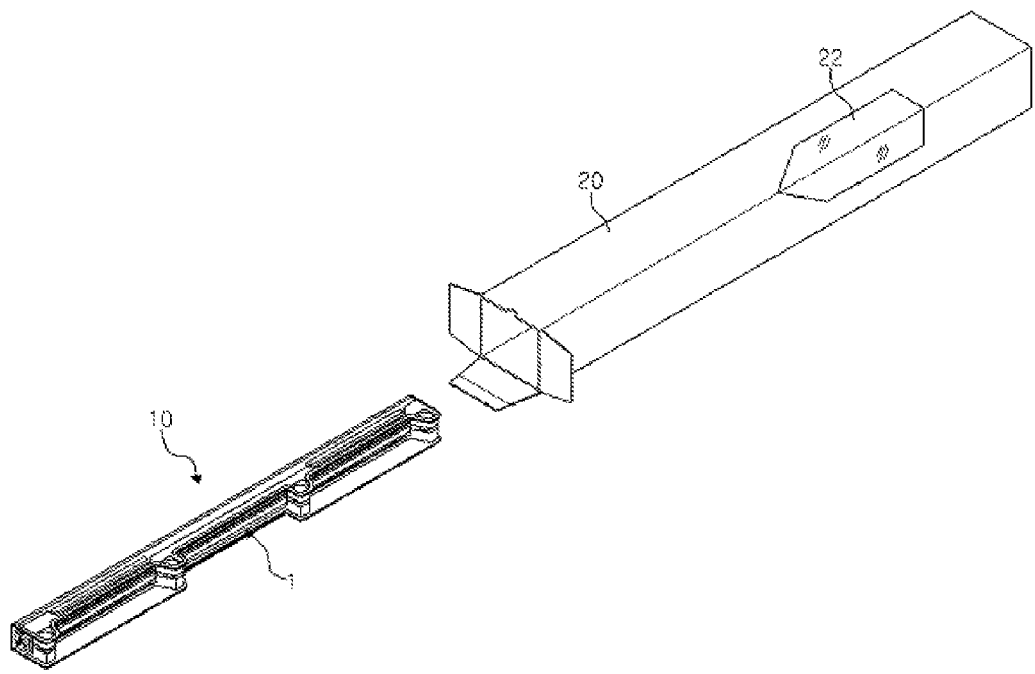
*FIG. 2     (Prior Art)*

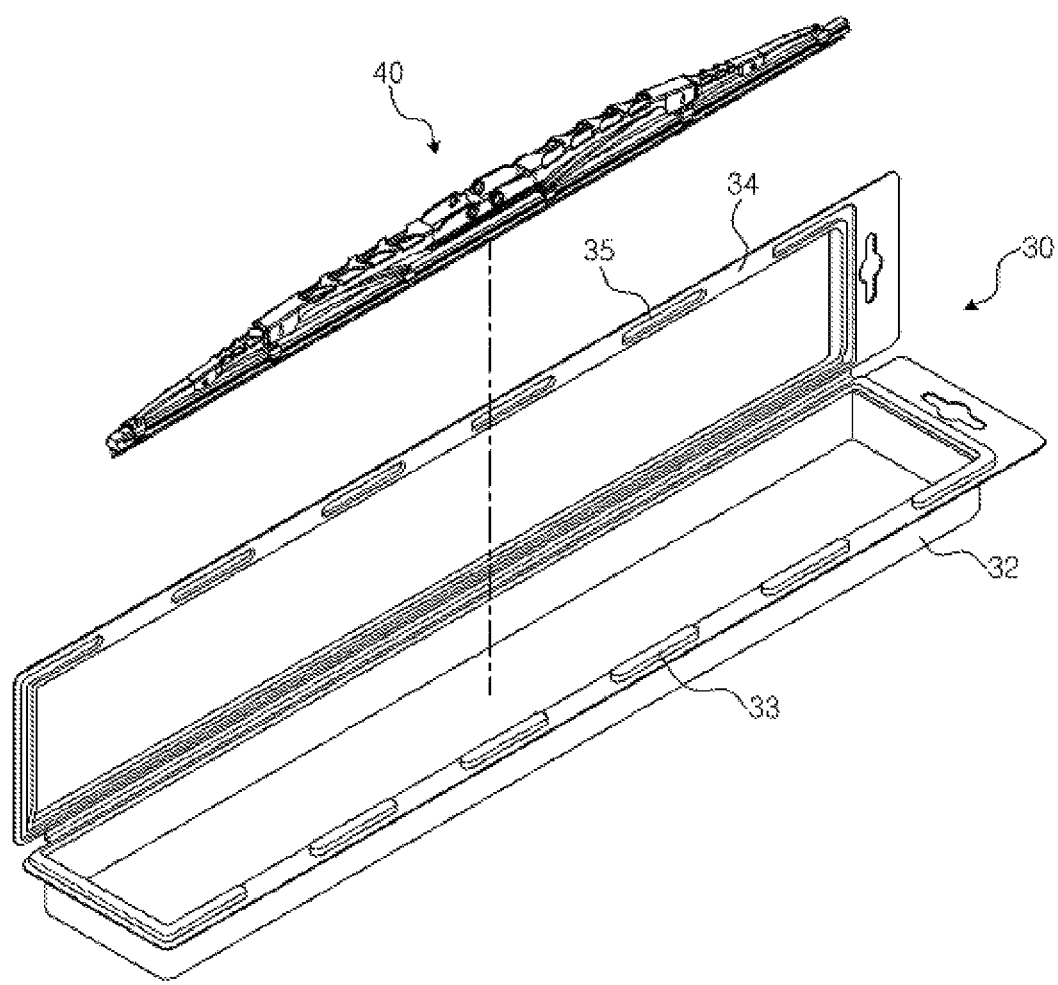
FIG. 3    (Prior Art)

PACKAGING CASE OF WIPER BLADE

BACKGROUND OF THE INVENTION

1. Field of the Invention

The present invention relates to a packaging case of a wiper blade used to wipe rain or dirt from a windscreen of automobiles, and more particularly to a wiper blade packaging case that has not only a fundamental function of accommodating and packaging wiper blades in a compact state, but also additional functions of protecting an appearance of the wiper blades thereby to prevent damage of the wiper blades during delivery or distribution.

2. Description of the Related Art

Almost all automobiles are equipped with a wiper blade serving to clean or wipe a windshield in order to prevent unclear view caused by contamination of the windshield due to dirt in air or various weather conditions. The wiper blade wipes the windshield while pivoting at a predetermined angle in a state of closely contacting the windshield, thereby securing a driver's sight for safe driving.

When such a wiper blade is worn out or lowered in contacting or wiping force due to long term use, it is necessary to replace it with a new wiper blade, which is generally encased in a separate packaging case and sold therewith.

FIG. 1 is a perspective view of an inner case of a conventional wiper blade packaging case and FIG. 2 is a perspective view of an outer case to receive the inner case of FIG. 1.

The conventional wiper blade packaging case as shown in FIGS. 1 and 2 comprises an inner case 10 to receive and secure a wiper blade or a wiper strip 1, and an outer case 20 to receive the inner case 10 with the wiper blade 1 secured therein. Therefore, such a conventional wiper blade packaging case makes packaging of the wiper blade or the wiper strip 1 cumbersome and often results in escape of the inner case 10 from the outer case 20 due to an impact during delivery or distribution of the packaging case. Furthermore, to check condition of the wiper blade or the wiper strip 1 packaged in the packaging case, consumers have the inconvenience of opening the outer case 20. In this regard, although some conventional packaging cases are provided with a window 22 in the outer case 20 to overcome such inconvenience, the outer case 20 having the window 22 formed therein increases manufacturing costs of the packaging case.

FIG. 3 is a perspective view of another conventional wiper blade packaging case.

Referring to FIG. 3, the conventional wiper blade packaging case 30 is an integral packaging case that comprises a body 32 to receive a wiper blade 40, and a cover 34 connected to the body 32 to cover the body 32. The body 32 is formed on the perimeter thereof with a plurality of protrusions 33, and, the cover 34 is formed with a plurality of recesses 35 to which the protrusions 33 are fitted and secured.

For the packaging case 30 having such a configuration as mentioned above, the protrusions 33 are press-fitted and secured into the recesses 35, with the cover 34 covering the body 32.

However, since the packaging case 30 is not provided with means to hold the wiper blade 40 securely therein, the wiper blade 40 accommodated in the packaging case 30 is likely to experience scratching, peeling-off of paint, and the like due to contact with the packaging case 30 during delivery or distribution. Furthermore, since the wiper blade 40 is accommodated in a curved shape corresponding to a rounded face of the windshield, the packaging case occupies a large volume in a packaging state, causing an increase in delivery and distribution costs.

Moreover, as the various wiper blades having a variety of shapes have been recently developed to improve performance, there is a need for a new wiper blade packaging case having a proper internal shape corresponding to the various wiper blades.

BRIEF SUMMARY OF THE INVENTION

The present invention is conceived to solve the problems of the conventional techniques as described above, and an object of the present invention is to provide a wiper blade packaging case that protects a wiper blade from external force to prevent damage of the wiper blade during delivery and distribution, and that enables compact, simple and tight packaging of the wiper blade such that the packaging case is not easily separated during the distribution.

In accordance with one aspect of the present invention, the above and other objects can be accomplished by the provision of a packaging case of a wiper blade including a wiper strip to wipe a windshield of an automobile, comprising: a body having an accommodation space to accommodate the wiper blade and an opening to open the accommodation space; a cover connected pivotally to one side of the body via a first connecting part to cover the opening; and a locking section connected pivotally to the other side of the body via a second connecting part to be engaged with the body with one end of the cover interposed between the locking section and the body.

In accordance with another aspect of the present invention, a packaging case of a wiper blade including a wiper strip to wipe a windshield of an automobile is provided, comprising: a body having an accommodation space to accommodate the wiper blade and an opening to open the accommodation space; a cover to cover the opening; and locking sections respectively connected pivotally to opposites sides of the body in a longitudinal direction via connecting parts to be engaged with the body with one end of the cover interposed between each of the locking sections and the body.

The body may comprise a plurality of securing protrusions formed on a face adjacent to the locking section, and the locking section may comprise a plurality of fitting holes press-fitted to the securing protrusions. The cover may comprise a plurality of through-holes through which the securing protrusions pass and are inserted. Further, each of the connecting parts has a ring-shaped cross-section and is elastically deformable. The packaging case may further comprise a projection formed in the accommodation space of the body to secure the wiper blade accommodated in the body. In particular, the accommodation space of the body may have a space to accommodate the wiper strip and preferably having a size to prevent the wiper strip from contacting an inner surface of the body when the wiper blade is completely accommodated in the body. The body may further comprise a plurality of clips formed therein to secure printed matter.

BRIEF DESCRIPTION OF THE SEVERAL VIEWS OF THE DRAWINGS

The above and other objects, features and advantages of the present invention will become apparent from the following description of preferred embodiments given in conjunction with the accompanying drawings, in which:

FIG. 1 is a perspective view of an inner case of a conventional wiper blade packaging case;

FIG. 2 is a perspective view of an outer case to receive the inner case of FIG. 1;

FIG. 3 is a perspective view of another conventional wiper blade packaging case;

DETAILED DESCRIPTION OF THE INVENTION

Exemplary embodiments of the present invention are described in detail with reference to the accompanying drawings hereinafter.

Figure 4:
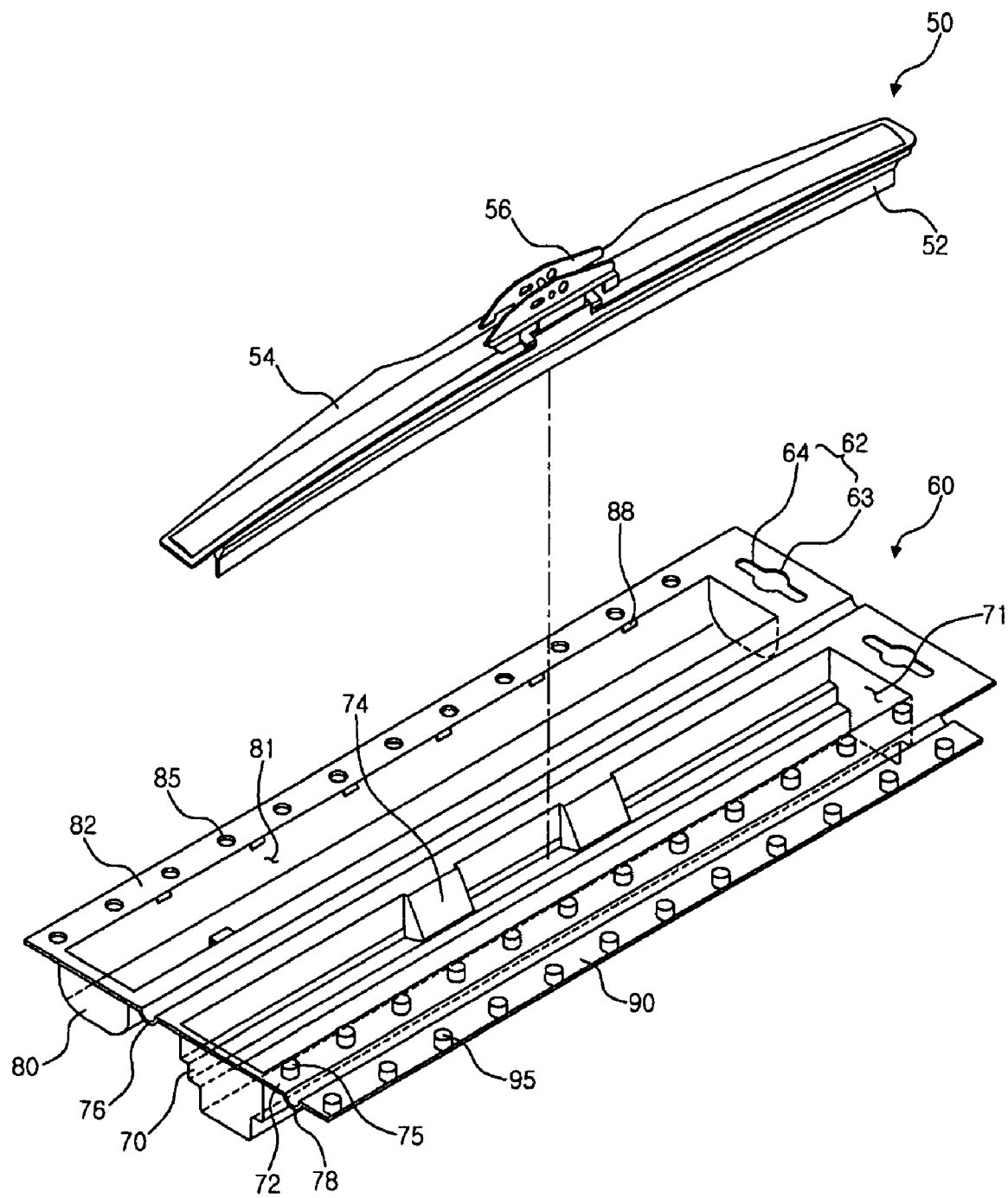
FIG. 4 is a perspective view of a packaging case of a wiper blade according to an embodiment of the present invention, in which the packaging case is opened to accommodate the wiper blade.
Figure 5:
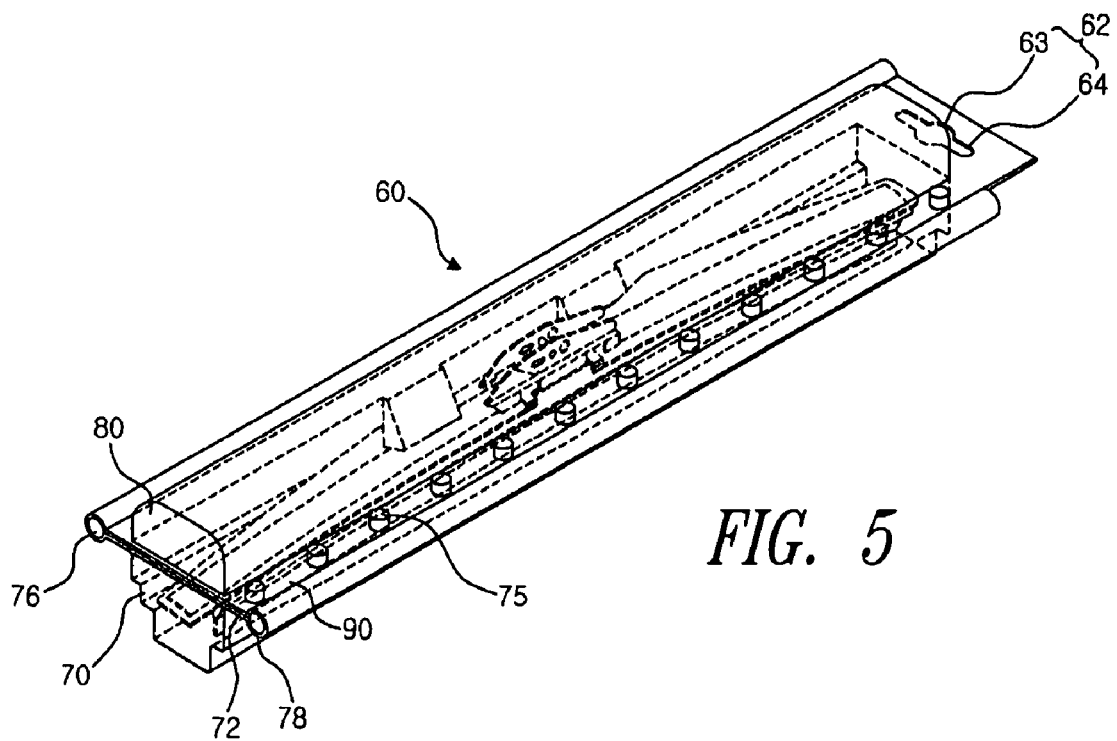
FIG. 5 is a perspective view of the packaging case of the wiper blade according to an embodiment of the present invention, in which the wiper blade is accommodated in the packaging case.

FIG. 4 is a perspective view of a packaging case of a wiper blade according to one embodiment of the present invention, in which the packaging case is opened to accommodate the wiper blade, and FIG. 5 is a perspective view of the packaging case of the wiper blade according to one embodiment of the present invention, in which the wiper blade is accommodated in the packaging case.

Referring to FIGS. 4 and 5, the packaging case 60 of a wiper blade is used for packaging the wiper blade 50 serving to clean or wipe dirt from a windshield of an automobile in a state of closely contacting the windshield.

Generally, the wiper blade 50 comprises a wiper strip 52 to make close contact with the windshield, a frame 54 configured to mount the wiper strip 52 thereon, and a connector 56 coupled to the frame 54 so as to be coupled to a wiper arm of the automobile.

The windshield of the automobile has a predetermined curvature to lessen air resistance and the frame 54 elastically compresses the wiper strip 52 to make close contact with the windshield. Therefore, the wiper blade 50 is given a predetermined curvature corresponding to the curvature of the windshield.

Such a wiper blade 50 is provided as a replaceable component and is commonly available from automobile specialty shops, large distribution and discount stores, etc.

The wiper blade 50 can be sold in a separate packaging case 60 for identification and protection of the products. The packaging case 60 prevents damage of the wiper blade 50 accommodated therein and enables the wiper blades 50 to be maintained in an optimal state. In addition, the packaging case 60 allows the wiper blade 50 to be maintained in an unfolded state, reducing a volume occupied by the wiper blade 50.

Such a packaging case 60 of the wiper blade comprises a body 70 having a predetermined accommodating space 71 defined therein to accommodate the wiper blade 50, and a cover 80 connected with the body 70 to cover the accommodating space 71.

The body 70 has an opening, through which the wiper blade 50 is placed in or taken out from the accommodating space 71, and a flange 72 extending horizontally from the perimeter of the opening.

The cover 80 has a receiving section 81 to receive a portion of the wiper blade 50 accommodated in the body 70 and a cover flange 82 extending from an outer periphery of the receiving section 81.

The cover 80 is connected pivotally to a first side of the body 70 by means of a first connection part 76 formed therebetween. The first connection part 76 may include a ring-shaped cross section and a predetermined elasticity.

Further, the body 70 is formed at a second side of the body 70, opposed to the first side, with a locking section 90 to restrict the cover 80 when the cover 80 covers the opening of the body 70. The locking section 90 is connected pivotally to the other side of the body 70 by means of a second connection part 78. The second connection part 78 may include a ring-shaped cross section so as to have a predetermined elasticity.

With the cover 80 covering the opening of the body, the locking section 90 is coupled to the case flange 72 such that a portion of the cover flange 82 is interposed between the case flange 72 and the locking section 90.

Preferably, the case flange 72 is formed with securing protrusions 75 adjacent the locking section 90, and the locking section 90 is formed with fitting holes 95 into which the securing protrusions 75 will be fitted and coupled.

More preferably, the cover flange 82 of the cover 80 is formed with through-holes 85 corresponding to the securing protrusions 75. Thus, with the through-holes 85 fitted to the securing protrusions 75, the securing protrusions 75 are inserted into the fitting holes 95 and the locking section 90 restricts the cover 80.

In the embodiment described above, the body 70 and the cover 80 are described as an integral component and are pivotally connected to each other via the first connecting part 76. Alternatively, the body 70 and the cover 80 can be formed as separate components, and the first connecting part 76 has the same configuration as that of the second connecting part 78.

Furthermore, the packaging case 60 of the wiper blade according to the present invention may have projections 74 respectively formed on opposite sides in the inner space of the body 70 to secure the wiper blade 50 received therein.

At this time, each of the projections 74 is formed to have a predetermined elasticity, so that, when the wiper blade 50 is packaged in the packaging case, the wiper frame 54 is fitted between the projections 74 and maintained in an unfolded state. Each of the projections 74 is not necessarily continuous and can be divided so as not to interfere with the connector 56 of the wiper blade 50. Additionally, the projections 74 are not necessarily formed in a symmetrical shape. Rather, it is sufficient that the projections 74 are disposed to maintain the unfolded state of the wiper frame 54 when the wiper frame 54 is received in the body 70 and secured by the projections 74. Furthermore, the projections 74 may be disposed in a staggered pattern on the opposite sides in the body, so that the wiper blade 50 can be more easily inserted or taken out from between the projections 74.

And, a space where the wiper strip 52 is accommodated, that is, a lower portion of the accommodation space 71 of the body 70 where the wiper blade 50 is accommodated, preferably has at least a size to prevent the wiper strip 52 from contacting the inner surface of the body 70 when the wiper blade 50 is completely accommodated in the body 70.

The body 70 may further comprise a plurality of clips 88 therein to secure printed matter such as publicity prints or product manual. Each of the clips 88 is formed to have a predetermined elasticity and is configured to fit and secure the printed matter therebetween. Preferably, the clips 88 are formed at one side of the cover 80 so that the printed matter can be more easily recognized from the outside.

The packaging case 60 of the wiper blade having such a configuration as described above may be formed of synthetic resins. Specifically, a portion or all of the packaging case 60 may be formed of a transparent material to allow a serviceman or a user to see the interior of the packaging case. Furthermore, the packaging case 60 may have various colors to allow more easy recognition of the products from other products or to provide distinction of the products and more appealing appearance to the products.

The packaging case 60 may have a display part 62 formed at one side such that the packaging case 60 can be hung on and kept in a display rack used for storage or selling of wiper blinds encased in the packaging case 60. The display part 62 is formed by a combination of a circular hole 63 and a linear groove 64 such that the packaging case 60 can be hung on any display rack having a circular rack rod or a thin plate-shaped rack rod. The circular hole 63 is formed at the center of the linear groove 64. The packaging case 60 of the wiper blade having such a configuration can be displayed in a state wherein the packaging case is suspended from a rack rod of the display rack through the display part 62 when displaying the products for sale and/or storage.

Figure 6:
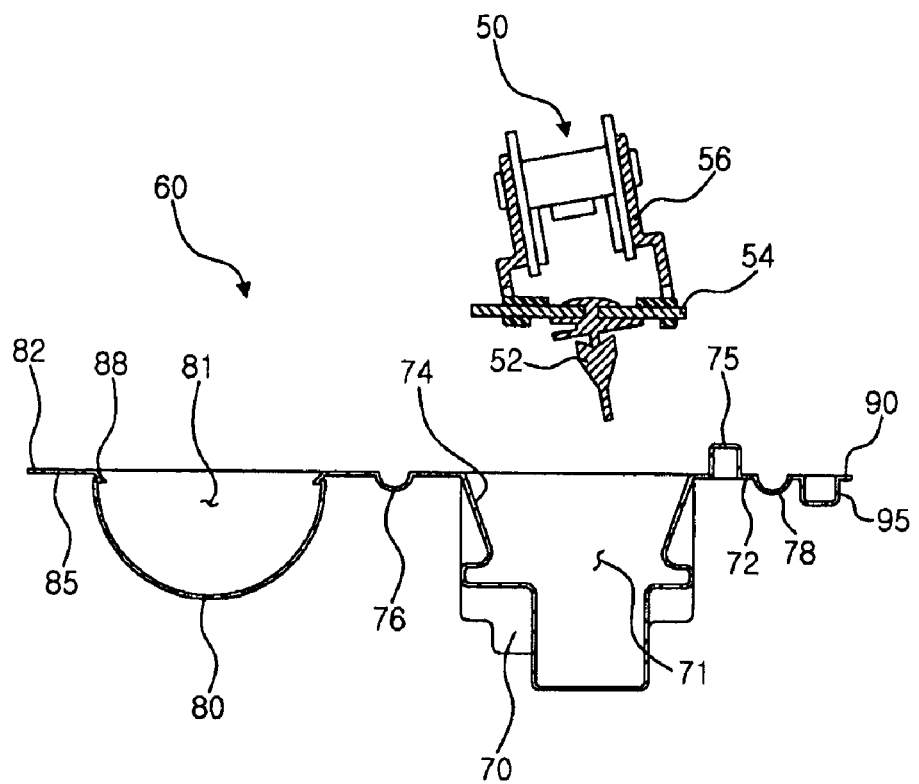
FIGS. 6 to 8 are cross-sectional views illustrating the packaging case of the wiper blade according to an embodiment of the present invention from an open state to a closed state to accommodate the wiper blade.
Figure 7:
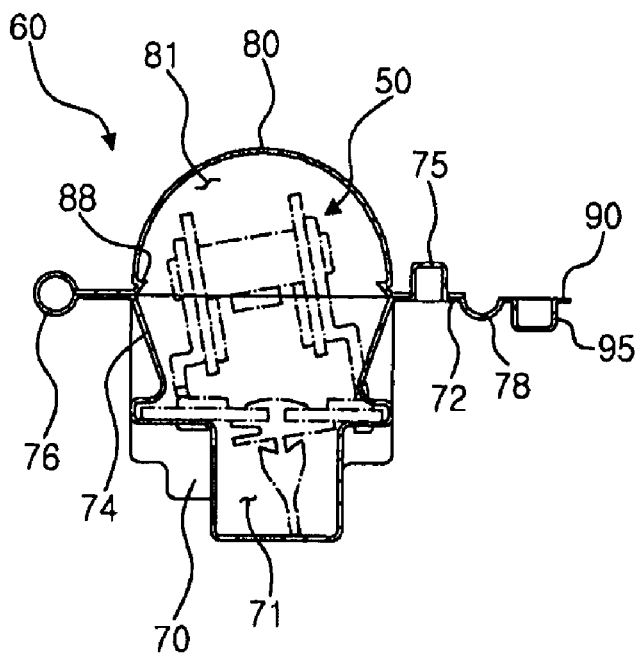
Figure 8:
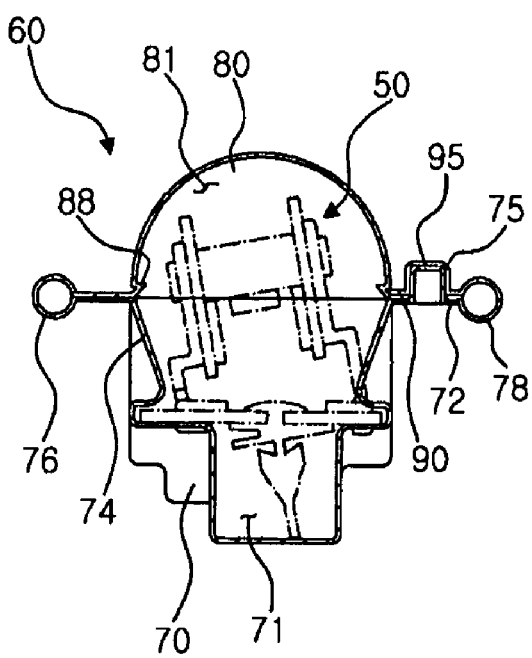

FIGS. 6 to 8 are cross-sectional views illustrating the packaging case of the wiper blade according to the present invention from an open state to a closed state to accommodate the wiper blade.

Hereinafter, a process of accommodating the wiper blade in the packaging case according to an embodiment of the present invention is described with reference to FIGS. 6 to 8.

First, the wiper blade 50 is put in the accommodating space 71 of the body 70. At this time, when the frame 54 of the wiper blade 50 is forced to be located under lower surfaces of the projections 74 of the body 70, the wiper blade 50 is maintained in an unfolded state without any bending, and, the wiper strip 52 is maintained without contact with the inner surface of the body 70.

Then, the cover 80 connected to the one side of the body 70 is rotated to cover the opening of the body 70. At this time, the securing protrusions 75 formed on the case flange 72 penetrate the through-holes 85 formed in the cover flange 82 of the cover 80.

Then, the locking section 90 connected to the second side of the body 70 is rotated to force the fitting holes 95 of the locking section 90 to be fitted onto the securing protrusions 75 of the body 70 with the cover flange 82 of the cover 80 interposed between the locking section 90 and the case flange 72 of the body 70.

On the other hand, the packaging case 60 of the wiper blade 50 is provided therein with printed matter such as publicity paper or product manual by inserting the printed matter into the clips 88 before the cover 80 is coupled to the body 70.

As apparent from the above description, according to the present invention, a wiper blade can be held and firmly secured in a packaging case so that the wiper blade can be protected from the outside and prevented from being damaged by the packaging case. Furthermore, since the packaging case according to embodiments of the preset invention encases the wiper blade in an unfolded state, the packaging volume of the packaging case occupied by the wiper blade is decreased, thereby reducing physical distribution costs related to delivery and distribution. Moreover, since the packaging case can secure a cover to a body of the packaging case with ease and tightness, it can reduce time required for packaging.

Although the present invention has been described with reference to the embodiments and the accompanying drawings, it is not limited to the embodiments and the drawings. It should be understood that various modifications and changes can be made by those skilled in the art without departing from the spirit and scope of the present invention defined by the accompanying claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A packaged wiper blade comprising:
    a wiper blade configured to wipe a windshield of an automobile, the wiper blade including a wiper strip configured to make close contact with the windshield, a frame configured to mount the wiper strip thereon, the frame assuming a folded state and configured to assume an unfolded state upon application of a force, and a connector coupled to the frame and configured to be coupled to a wiper arm of the automobile; and
    a packaging case enclosing the wiper blade, the packaging case comprising:
        a body having a bottom, opposing first and second sides, an accommodation space to receive the wiper blade between the opposing first and second sides, and an opening to provide access to the accommodation space;
        a cover connected pivotally to the first side of the body via a first connecting part to cover the opening;
        a locking section connected pivotally to the second side of the body, opposed to the first side, via a second connecting part to be engaged with the body with one end of the cover interposed between the locking section and the body; and
        at least one projection formed in the accommodation space of the body on each of the first and second sides to secure the wiper blade against a portion of the body as the wiper blade is received in the body and maintain the wiper blade substantially straightened in the unfolded state with the wiper strip of the wiper blade oriented toward the bottom of the body of the packaging case and the connector oriented toward the opening.

2. The packaged wiper blade according to claim 1, wherein the body of the packaging case comprises a plurality of securing protrusions formed on a face adjacent to the locking section, and the locking section comprises a plurality of fitting holes press-fitted to the securing protrusions.

3. The packaged wiper blade according to claim 2, wherein the cover of the packaging case comprises a plurality of through-holes through which the securing protrusions pass and are inserted.

4. The packaged wiper blade according to claim 1, wherein each of the connecting parts of the packaging case has a ring-shaped cross-section and is elastically deformable.

5. The packaged wiper blade according to claim 1, wherein the cover of the packaging case further comprises a plurality of clips formed therein to secure printed matter.

6. The packaged wiper blade according to claim 1, wherein the accommodation space of the body of the packaging case has a space to accommodate the wiper strip and having a size to prevent the wiper strip from contacting an inner surface of the body.

7. The packaged wiper blade according to claim 1 wherein at least two longitudinally spaced projections are formed in the accommodation space of the body on each of the first and second sides, the projections configured to secure the wiper blade against a portion of the body at both of a first and a second side of the connector of the wiper blade.

8. The packaged wiper according to claim 1 wherein the projections are formed to have a predetermined elasticity such that when the wiper blade is packaged in the packaging case the wiper blade is fitted between the projections.

9. A packaged wiper blade comprising:
a wiper blade configured to wipe a windshield of an automobile, the wiper blade including a wiper strip configured to make close contact with the windshield, a frame configured to mount the wiper strip thereon, the frame assuming a folded state and configured to assume an unfolded state upon application of a force, and a connector coupled to the frame and configured to be coupled to a wiper arm of the automobile; and
a packaging case enclosing the wiper blade, the packaging case comprising:
a body having a bottom, opposing first and second sides, an accommodation space to receive the wiper blade between the opposing first and second sides, and an opening to provide access to the accommodation space;
a cover to cover the opening;
a plurality of locking sections respectively connected pivotally to opposite sides of the body in a longitudinal direction via connecting parts to be engaged with the body with one end of the cover interposed between each of the locking sections and the body; and
at least one projection formed in the accommodation space of the body on each of the first and second sides to secure the wiper blade against a portion of the body as the wiper blade is received in the body, the projections maintaining the frame substantially straightened in the unfolded state with the wiper strip of the wiper blade oriented toward the bottom of the body of the packaging case and the connector oriented toward the opening when the frame is received in the body and secured by the projections.

10. The packaged wiper blade according to claim 9, wherein the body of the packaging case includes a plurality of securing protrusions formed on a face adjacent to the locking section, and the locking section comprises a plurality of fitting holes press-fitted to the securing protrusions.

11. The packaged wiper blade according to claim 10, wherein the cover of the packaging case comprises a plurality of through-holes, the securing protrusions configured to pass through and be securely inserted in the through-holes.

12. The packaged wiper blade according to claim 9, wherein each of the connecting parts of the packaging case has a ring-shaped cross-section and is elastically deformable.

13. The packaged wiper blade according to claim 9, wherein the cover of the packaging case further comprises a plurality of clips formed therein to secure printed matter.

14. The packaged wiper blade according to claim 9, wherein the accommodation space of the body of the packaging case has a space to accommodate the wiper strip and having a size to prevent the wiper strip from contacting an inner surface of the body.

15. A packaged wiper blade comprising:
a wiper blade; and
a packaging case enclosing the wiper blade, the packaging case including:
a body elongated longitudinally, the body having a casing and a case flange, the casing forming an interior space to receive the wiper blade, and including first and second lateral sides, the case flange extending longitudinally along the first lateral side of the casing, the case flange having first and second lateral sides, the first lateral side of the case flange connected to the first lateral side of the casing, the case flange including a plurality of securing protrusions longitudinally spaced at first intervals;
a cover elongated longitudinally, the cover having first and second lateral sides, and a cover flange, the first lateral side of the cover pivotably coupled to the first lateral side of the body, the second lateral side of the cover connected to the cover flange, the cover flange having a plurality of holes longitudinally spaced at the first intervals;
a locking flange pivotably coupled to the second side of the case flange and having a plurality of fitting receptacles longitudinally spaced at the first intervals, the cover configured to pivot from an open state to a closed state, the locking flange configured to pivot between an unlocked and a locked state, in the closed state of the cover the plurality of securing protrusions penetrating the plurality of holes, respectively, a first surface of the cover flange positioning contiguous a surface of the case flange, in the locked state of the locking flange the plurality of securing protrusions nesting in, and securely engaging, the plurality of fitting receptacles, respectively, a surface of the locking flange positioning contiguous a second surface of the cover flange, opposed to the first surface, to secure the cover flange against movement in all directions; and
at least one projection coupled to or formed on each of the first and second lateral sides of the casing and projecting inwardly into the interior space, each projection extending along a portion of the corresponding lateral side and terminating at a retention surface spaced from a bottom surface of the casing, the retention surface engaging a portion of the frame of the wiper blade to secure the wiper blade against a portion of the body of the packaging case with a wiper strip of the wiper blade oriented toward the bottom surface of the casing and maintain the frame substantially straightened.

16. A packaged wiper blade comprising:
a wiper blade having a frame and a wiper strip secured to the frame, the frame of the wiper blade having a curved profile to conform to a windshield curvature, and the curved profile of the frame configured to be straightened upon application of a force; and
a packaging case, the packaging case comprising:
a body elongated longitudinally, the body having a casing forming an interior space to receive the wiper blade, the casing including a bottom surface and first and second lateral walls extending longitudinally;
a cover elongated longitudinally, the cover pivotably coupled to the body and configured to pivot between an open state and a closed state; and
at least one projection coupled to or formed on each of the first and second lateral walls of the casing and projecting inwardly into the interior space, each projection extending along a portion of the corresponding lateral wall and terminating at a retention surface spaced from the bottom surface of the casing, the retention surface engaging a portion of the frame of the wiper blade to secure the wiper blade against a portion of the body of the packaging case with the wiper strip of the wiper blade oriented toward the bottom surface of the body of the packaging case and maintain the frame substantially straightened.

* * * * *